United States Patent
Venkatachalam et al.

(10) Patent No.: US 10,645,570 B1
(45) Date of Patent: May 5, 2020

(54) CONTROLLING DEVICES USING SHORT MESSAGE SERVICE FROM ADMINISTRATIVE DEVICES

(71) Applicant: Zoho Corporation Private Limited, Pleasanton, CA (US)

(72) Inventors: Mathivanan Venkatachalam, Chennai (IN); Rajesh Ranganathan, Chengalpet (IN); Murugesan Duraipandi, Kanchipuram (IN); Vishal Santharam, Chengalpet (IN); Arthur Behiel, Pleasanton, CA (US); Sudheer Grandhi, Pleasanton, CA (US)

(73) Assignee: Zoho Corporation Private Limited, Kancheepuram District (IN)

( * ) Notice: Subject to any disclaimer, the term of this patent is extended or adjusted under 35 U.S.C. 154(b) by 0 days.

(21) Appl. No.: 16/153,708

(22) Filed: Oct. 6, 2018

Related U.S. Application Data

(60) Provisional application No. 62/625,894, filed on Feb. 2, 2018, provisional application No. 62/595,542, filed
(Continued)

(51) Int. Cl.
*H04W 8/24* (2009.01)
*H04L 12/58* (2006.01)
(Continued)

(52) U.S. Cl.
CPC .............. *H04W 8/245* (2013.01); *H04L 51/18* (2013.01); *H04W 4/14* (2013.01); *H04W 12/04* (2013.01)

(58) Field of Classification Search
CPC ......... H04W 4/16; H04W 12/08; H04W 4/80; H04W 12/12
See application file for complete search history.

(56) References Cited

U.S. PATENT DOCUMENTS

| 2002/0069259 A1 | 6/2002 | Kushwaha |
| 2005/0073389 A1 | 4/2005 | Chandley |

(Continued)

OTHER PUBLICATIONS

In view of *McKesson Information Solutions v. Bridge Medical* (Fed. Cir. 2007), the applicant wishes to inform the Examiner that the above-identified pending application is related to U.S. Appl. No. 16/153,707. The Examiner is encouraged to review the art made of record and any pertinent information.
(Continued)

*Primary Examiner* — Diane D Mizrahi
(74) *Attorney, Agent, or Firm* — Arthur Behiel; Mark Lauer; Silicon Edge Law Group LLP

(57) ABSTRACT

An administrator charged with responsibility for one or more administered wireless devices can use a wireless device to disable lost or stolen devices using an SMS lost-mode message. The payload of the lost-mode message can be encrypted to prevent malicious attacks. The payload may include a universal device identifier unique to the target device, the phone number of the administrator's device, and a time stamp memorializing command or message creation. Successful decryption authenticates the administrator. Before executing the lost-mode command, however, the target device reviews the unique identifier to verify the target and compares the phone number of the administrator's device with the number identified with the incoming SMS message to authenticate the relaying device. The target device can also consider an embedded time stamp to determine whether the lost-device command has been superseded.

14 Claims, 5 Drawing Sheets

Related U.S. Application Data on Dec. 6, 2017, provisional application No. 62/571,518, filed on Oct. 12, 2017.

(51) Int. Cl.
*H04W 4/14* (2009.01)
*H04W 12/04* (2009.01)

(56) References Cited

U.S. PATENT DOCUMENTS

| | | |
|---|---|---|
| 2010/0035588 A1 | 2/2010 | Adler |
| 2010/0251391 A1 | 9/2010 | Adrangi |
| 2011/0039572 A1 | 2/2011 | Lamb |
| 2017/0286920 A1* | 10/2017 | Silva ............... G06Q 10/30 |
| 2017/0286921 A1* | 10/2017 | Bowles ............ G06Q 20/18 |
| 2017/0293897 A1* | 10/2017 | Silva ............... G06Q 10/30 |

OTHER PUBLICATIONS

Achab, "SMS Gateway for MDaemon," brochure developed and distributed by Achab, 2004 (8 pages).

Lendino, "How to Remotely Disable Your Lost or Stolen Phone," published by PCMag at www.pcmag.com on Apr. 12, 2012 (9 pages).

Verma, "SMS for automobile security system developers," published by EDN at www.edn.com on Oct. 7, 2008 (10 pages).

Ozeki, "E-mail to SMS alert," published by Ozeki Informatics Ltd. at http://www.ozekisms.com and downloaded on Nov. 17, 2017 (3 pages).

\* cited by examiner

CONTROLLING DEVICES USING SHORT MESSAGE SERVICE FROM ADMINISTRATIVE DEVICES

BACKGROUND

Cloud-based or on-premises communication systems commonly include a server supporting multiple remote devices (e.g., cell phones and portable digital assistants) via a wide area network such as the Internet. When a remote device is lost or stolen, the user of the remote device can contact a system administrator with access to the server to have the device disabled or otherwise restricted remotely. Commands used to disable or restrict devices are conveyed via Internet connections that may not be available. There is therefore a need for a more robust mechanism for controlling lost or stolen devices.

BRIEF DESCRIPTION OF THE DRAWINGS

The details of the present invention, both as to its structure and operation, can best be understood by referring to the accompanying drawings, in which like reference numbers and designations refer to the same or similar elements.

DETAILED DESCRIPTION

Figure 1:
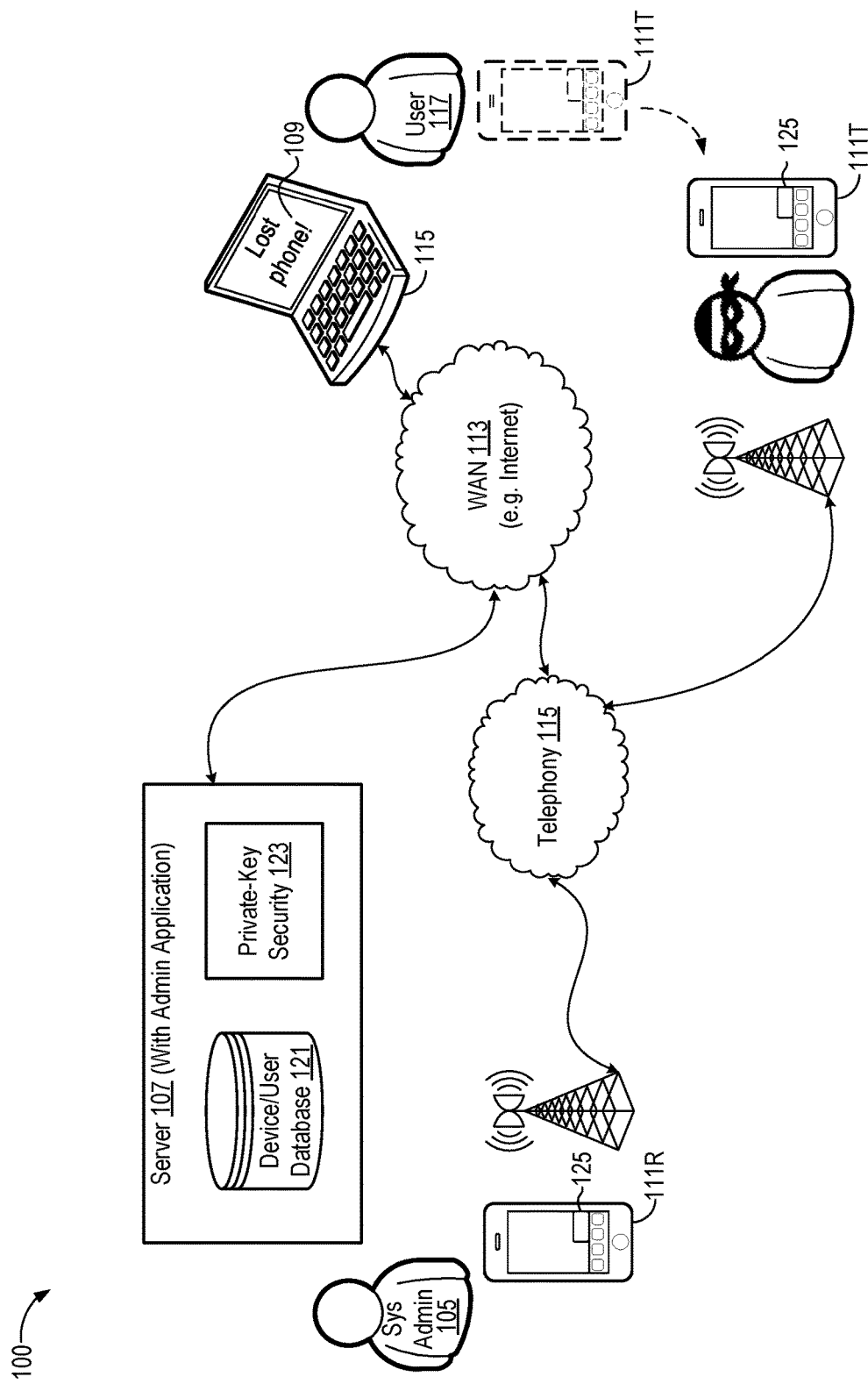
FIG. 1 depicts a networked communication system 100 that allows a system administrator 105 with access to a server 107 to manage a network of wired and wireless communication devices—e.g. a laptop computer 109 and mobile devices 111R and 111T—via a wide-area network 113 (e.g., the Internet) and available wireless telecommunication infrastructure 115.

FIG. 1 depicts a networked communication system 100 that allows a system administrator 105 with access to a server 107 to manage a network of wired and wireless communication devices—e.g. a laptop computer 109 and mobile devices 111R and 111T—via a wide-area network 113 (e.g., the Internet) and available wireless telecommunication infrastructure 115 (e.g. one or more cellular networks). In this example, mobile device 111T is assigned to a user 117 but has been lost or stolen. Important personal and business information stored therein is consequently at risk. System 100 allows user 117 to report the loss of mobile device 111T to server 107, and for server 107 to remotely disable this target device 111T by relaying a lost-mode command as a text message via relay device 111R, which may be assigned to system administrator 105 or another authorized user. The lost-mode command causes mobile device 111T to enter a "lost mode" that alters device functionality, such as to erase or otherwise prevent access to sensitive data.

Server 107 maintains a database 121 that relates authorized users to their respective authorized devices, including their mobile devices that support telephony (e.g. smartphones). Database 121 relates each authorized mobile phone to a user, a phone number, a private encryption key, and a Unique Device Identifier (UDID). Server 107 also includes software or hardware support 123 for public-key cryptography. As detailed below, server 107 maintains private keys and distributes associated public keys for security and authentication when issuing commands. Mobile devices 111R and 111T store a public key and support one or more applications 125—device agents—that allow mobile devices 111R and 111T to decrypt incoming SMS messages, execute commands embedded therein, and otherwise communicate with server 107.

Server 107 employs an authorized mobile device—relay device 111R in this example—as an SMS gateway to provide an administrator with simple, mobile control over system-wide device enrollment and control. This convenience introduces some complexities, however, as compared to providing all administrative control via a more direct interface to server 107. For example, the administrator and related relay device 111R can change, and both the server and relaying mobile phone should be authenticated by mobile devices that receive a lost-mode command, or any command for that matter. In other embodiments an SMS gateway can serve as relay device instead of or in addition to wireless device 111R.

Server 107 need not be a single machine or a set of machines administered by a single entity. In some embodiments, for example, server 107 represents a cloud-based environment that supports mobile-device management (MDM) services made available to users and institutions via the Internet. MDM is an industry term for the administration of mobile devices, but MDM can be applied to desktop computers. MDM is commonly implemented using third-party products so that users and institutions that require compute, storage, and network resources can increase capacity as needed without committing infrastructure and technical support.

Figure 2A:
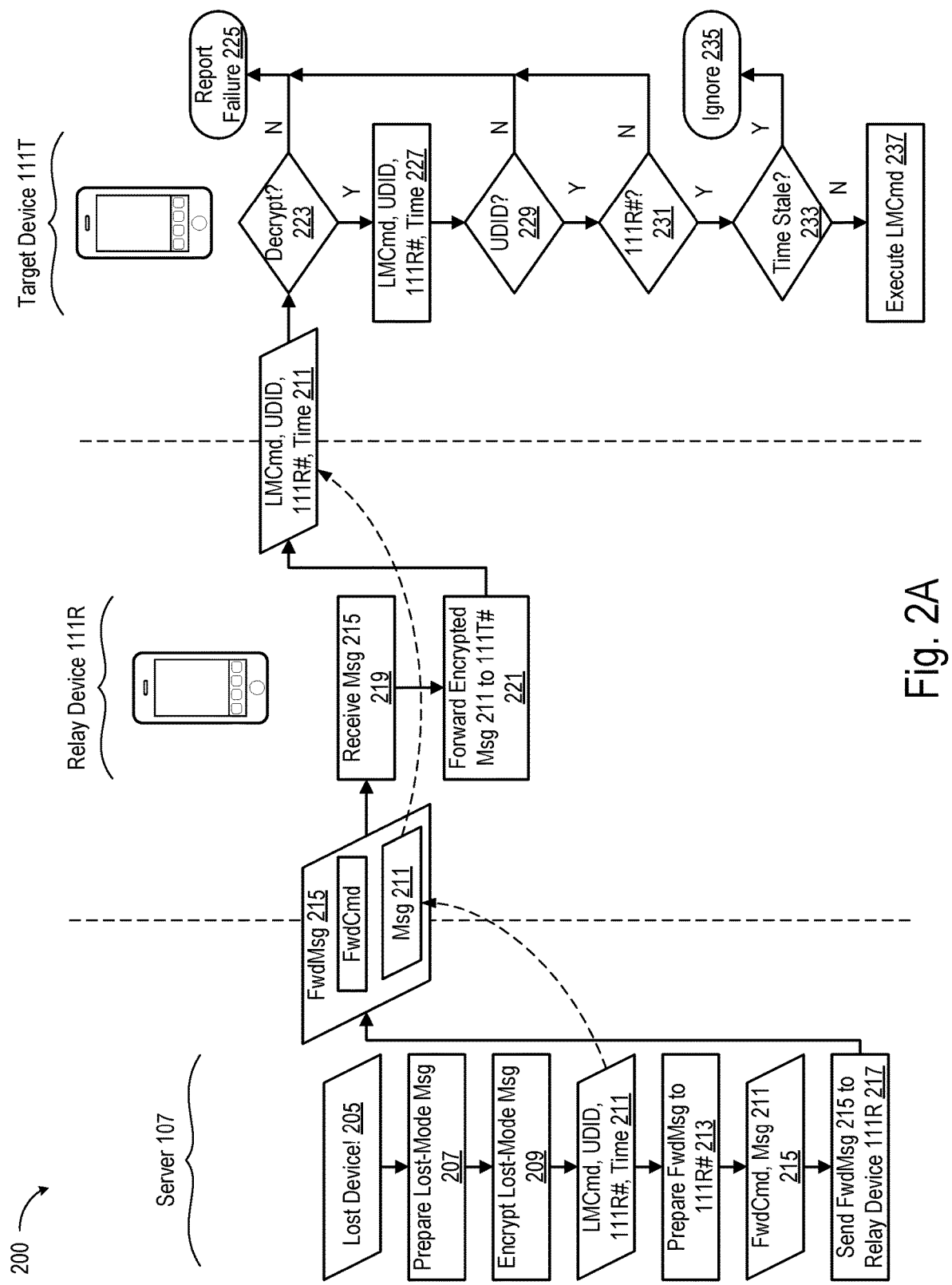
FIG. 2A is a flowchart 200 illustrating how server 107 forces target device 111T into a lost mode by conveying a lost-mode command LMCmd via relay device 111R.

FIG. 2A is a flowchart 200 illustrating how server 107 forces target device 111T into a lost mode by conveying a lost-mode command LMCmd via relay device 111R. The process begins when server 107 receives a message indicating that mobile device 111T is lost or stolen (205). Such a message can be conveyed via any form of communication, including by calling or texting an administrator with access to server 107, and can be sent to server 107 via a suitable application on relay device 111R, for example.

Next, server 107 retrieves from database 121 the phone number 111T # and the unique identifier UDID for the lost or stolen (now "unauthorized") target device 111T, and the relay-device phone number 111R # of relay device 111R. These data are used to prepare a lost-mode message directed to target device 111T (207). The term "lost-mode message" refers to a message that communicates a command, with or without additional payload, that puts the target device in a lost mode. The lost-mode message of this example includes a lost-mode command LMCmd, the UDID of target device 111T, relay-device phone number 111R #, and a lost-mode time stamp Time relating the time of command or message creation. The lost-mode message with its payload is then encrypted using a private key (209), which results in an encrypted lost-mode message 211. Server 107 maintains a private key and shares the corresponding public key with device agents 125 that reside on user devices (e.g., when administrator 105 assigns an employee a mobile phone, laptop computer, etc.). This encryption guards against the possibility of errant or malicious commands interfering with an authorized device. For example, an unauthorized device may intercept and store a valid command to launch a "replay attack" that simply repeats the command.

In step 213, server 107 retrieves from database 121 the relay-device phone number 111R and prepares a forwarding message 215 directed to relay device 111R. Forwarding message 215 includes as payload the encrypted lost-mode message 211 and a forwarding command FwdCmd instructing relay device 111R to forward lost-mode message 211 to target-device phone number 111T # as e.g. an SMS message. Server 107 is communicatively coupled to relay device 111R via a cellular carrier that communicates SMS messages in this example but other networks and protocols can be used instead of or in addition to these examples. Database 121 can includes lists and schedules of administrators and their respective devices, and more than one relay device may be enlisted to forward lost-mode commands.

Server 107 sends forwarding message 215 to relay device 111R (217) via wireless telephony infrastructure 115 as an SMS message or using any other suitable protocol. Forwarding message 215 and the related payload can be broken into multiple SMS messages to e.g. relay more data. The term "forwarding message" refers to a message that communicates a command to forward data associated with the forwarding message. The data associated with the forwarding message, including a lost-mode command in this example, need not accompany the forwarding message but can be stored or otherwise accessible to the forwarding device before or after receipt of the forwarding message.

Relay device 111R receives message 215 (219). Responsive to the embedded forwarding command, relay device 111R forwards encrypted lost-mode message 211 to target-device phone number 111T # as e.g. an SMS message (221). Target device 111T thus receives an encrypted payload with (1) lost-mode command LMCmd, (2) device identifier UDID, (3) relay-device phone number 111R #, and (4) the lost-mode time stamp. Lost-mode message 211 and the related payload can be broken into multiple messages to e.g. relay more data.

Relay device 111R can report the sending of lost-mode message 211 to server 107. In some embodiments server 107 prepares and sends multiple forwarding messages 215 for conveyance by multiple relay devices, or successively tries different relay devices until one of the relay devices reports a successful sending of message 211 or target device 111T reports successful receipt either directly or via relay device 111R. Some embodiments require the administrator of relaying device 111R to authorize the conveyance of message 211 via the user interface of device 111R.

Target device 111T attempts to decrypt message 211 using its stored public key. Per decision 223, device 111T reports decryption failure back to relay device 111R (225), which relays the failure report to server 107. Encryption thus authenticates server 107 to protect authorized devices from errant or malicious lost-mode commands.

Should decryption succeed, target device 111T processes the decrypted message 227 to consider execution of lost-mode command LMCmd. Per decision 229, if the device identifier UDID that arrived with the command does not match that of target device 111T, then lost-mode command LMCmd was evidently misdirected; target device 111T therefore disregards lost-mode command LMCmd and reports the failure. This report may indicate the basis for failure so server 107 and/or administrator 105 may take remedial action. Server 107 can include target-device number 111T # in the lost-mode message to be used with or instead of identifier UDID in decision 229. In some embodiments the encrypted payload excludes a portion of the data conveyed in the example of message 211. In one embodiment, for example, only identifier UDID and relay-device phone number 111R # are encrypted. Lost-mode command LMCmd can be sent in the clear because execution of the command is contingent upon the correct identities of relay device 111R and target device 111T.

Target device 111T also compares relay-device phone number 111R # with a number identified with the incoming SMS message by the cellular carrier (decision 231). Server 107 embedded relay-device phone number 111R # in the encrypted SMS message to allow target mobile device 111T to authenticate relay device 111R, and thus prevent unauthorized devices from forwarding malicious commands. If relay-device phone number 111R # does not match the number identified with the incoming SMS message, then mobile device 111T disregards lost-mode command LMCmd and reports the failure. This report may indicate the basis for failure so server 107 and/or administrator 105 may take remedial action.

In the final decision (233) for this example, target device 111T compares the time stamp noting the time the lost-mode message or command was created with time stamps associated with previously received commands. Messages, and thus commands, are not always received in order of creation. A lost device later reported as found may receive a "found-mode" command to restore device capability before a previously sent lost-mode command is received. The time stamp associated with lost-mode command LMCmd ensures that the lost-mode command is only executed (237) if not superseded by a subsequently issued though later received command. Other embodiments omit the time stamp. In one embodiment both server 107 and relay device 111R can provide a respective time stamp so that both relay device 111R and target device 111T can ignore stale commands.

Should target device 111T obey lost-mode command LMCmd, the software agent on target device 111T acts to impair device functionality, such as by erasing or otherwise restricting access to sensitive data. In some embodiments a device in the lost mode communicates wirelessly via SMS with server 107 to e.g. report successful entry into the lost mode, receive and execute other commands, and provide location updates to aid in finding the lost device. In some embodiments a device will automatically enter a lost mode if it fails to receive an authorization command or user authentication for some period, and server 107 can issue commands to set that period. Server 107 or relay device 111R can, for example, issue a command instructing target device 111T to enter a lost mode if user 117 does not enter login credentials (e.g. the passcode) and device 111T does not receive an authorization command for 24 hours. Shorter times may also be used, as it is unlikely that the mobile phone of a busy user will be both unattended and lack access to cellular infrastructure for extended periods. In some embodiments the lost-mode command queries the user for authentication before more fully impairing device functionality.

Figure 2B:
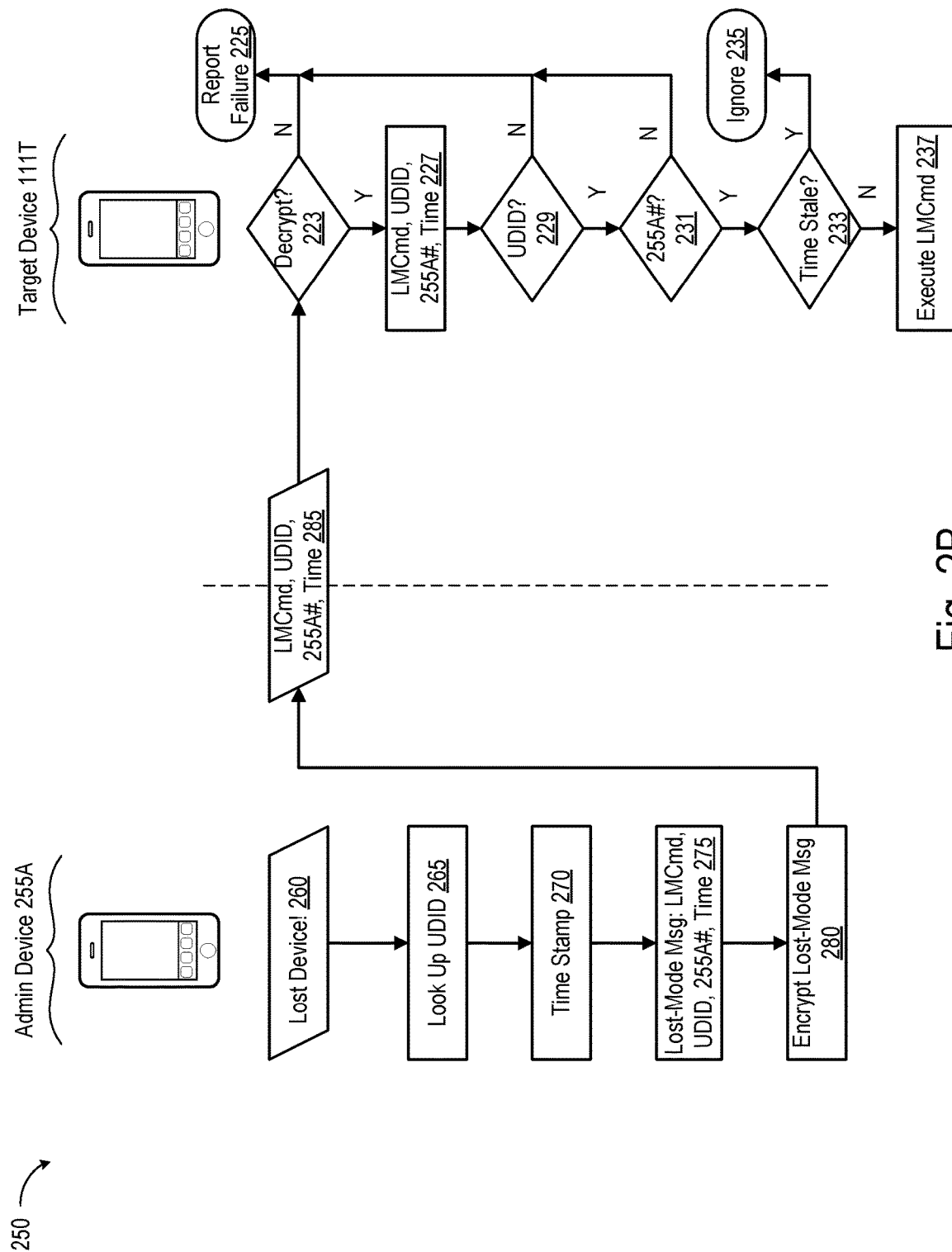
FIG. 2B is a flowchart 250 illustrating how an administrative device 255A forces target device 111T into a lost mode by creating and conveying a lost-mode command LMCmd.

FIG. 2B is a flowchart 250 illustrating how an administrative device 255A, an SMS-compatible mobile device with or with access to a database relating users to mobile-device numbers, forces target device 111T into a lost mode by creating and conveying a lost-mode command LMCmd. Administrative device 255A can be assigned administrative control over one or more other devices by a remote service. In one embodiment, for example, a server maintains an administrator schedule that empowers alternative wireless devices to act as administrative device 255A during times that match the days and hours of responsibility for the administrators assigned the devices. Reports of lost or stolen devices can thus be directed to the administrative device or devices of one or more on-duty administrators. As used herein, the term "administrative device" refers to a device capable of issuing commands to one or more target devices. Target devices may be administrative devices if configured in hardware or software to issue commands. Likewise, administrative devices may be target devices if capable of executing commands received from administrative devices.

The process begins when administrative device 255A receives a message indicating that mobile device 111T is lost or stolen (260). Such a message can be conveyed via any form of communication, including by calling, texting, emailing or speaking to an administrator with access to device 255A, or by notifying server 107 to send a trigger message to administrative device 255A. The message identifies the lost phone using e.g. the target-device phone number 111T # or the user name to which the target device 111T is assigned.

Next, administrative device 255A retrieves from a local or remote database the unique identifier UDID for the lost or stolen (now "unauthorized") target device 111T and the target-device phone number 111T # if not specified in the message reporting the lost device (265). A time stamp Time noting the time of command creating is also included (270). Unique identifier UDID and time stamp Time are used to prepare a lost-mode message directed to target device 111T (275). The lost-mode message includes a lost-mode command LMCmd, the UDID of target device 111T, administrative-device phone number 255A #, and time stamp Time relating the time of command or message creation. The lost-mode message with its payload is encrypted using a private key (280), which results in an encrypted lost-mode message 285. Time stamp Time can be retrieved from or shared with a remote server that keeps track of the timing of commands that may be issued by more than one administrative device.

Administrative device 255A may include software or hardware support for public-key cryptography. A private key may be distributed to administrative device 255A by e.g. server 107 (FIG. 1) or a trusted third party. A public key associated with the private key can likewise be distributed to target devices. Target device 111T stores the public key and supports one or more applications (e.g. device agents) that allow target device 111T to decrypt the encrypted parts of incoming messages.

As an alternative to step 280, the lost-mode message or a portion of its payload can be encrypted at the server so that the private key used for encryption need not reside on administrative device 255A. Administrative device 255A may, for example, request a lost-mode message of server 107 and receive in response encrypted data that includes e.g. lost-mode command LMCmd, the administrative device number 255A #, the UDID and/or phone number of target device 111T, and time stamp Time. Each administrative device 255A can also have or have access to an encrypted element containing its own administrative-device phone number 255A #. This element could then be accessed locally or remotely as need arises for issuing lost-mode messages. In one embodiment each administrative device is provided with an encrypted administrative-device phone number and an encrypted UDID for each administered device, all of which can be stored locally in a contacts database. These data can be used to formulate lost-mode and other control messages without requiring further interaction with a remote server.

Encrypted lost-mode message 285 can be similar or identical to encrypted lost-mode message 211 of FIG. 2A, and the processing performed at target device 111T can be as noted previously for like-identified elements. Elements 227 and 231 are amended relative to the example of FIG. 2A to reflect the fact that the incoming message is from phone number 255A # rather than from relay device 111R but the underlying functionality is the same. A detailed discussion of the actions of target device 111T is therefore omitted here in favor of the discussion of FIG. 2A.

Lost-mode message 285 is a single SMS message in the foregoing examples but the data can instead be delivered using two or more messages. References to "a lost-mode message" should therefore be read to encompass two or more of SMS messages used together to cause a target device to enter the lost mode. Lost-mode message 285 can also be repeated periodically by one or more administrative devices until receipt is confirmed by the target device.

Centralized command and time-stamp storage assists decision 233 in systems that support multiple or changing administrative devices 255A. Target device 111T can receive commands from multiple devices. A lost device reported to day-shift administrators may later be reported found to a night-shift administrator, for example. Centralized message tracking allows the server or administrative device to share a report of a found device to the day-shift administrators to resolve the issue.

The foregoing discussion focuses on methods and systems for limiting access to lost or stolen mobile phones, and therefore on support for lost-mode commands directed to mobile phones. Security and authentication features supported by these methods and systems are also advantageous in communicating commands other than forwarding and lost-mode commands to mobile phones and other types of compute devices. The disclosure is thus not limited to phones, phone numbers, or unauthorized devices.

Figure 3:
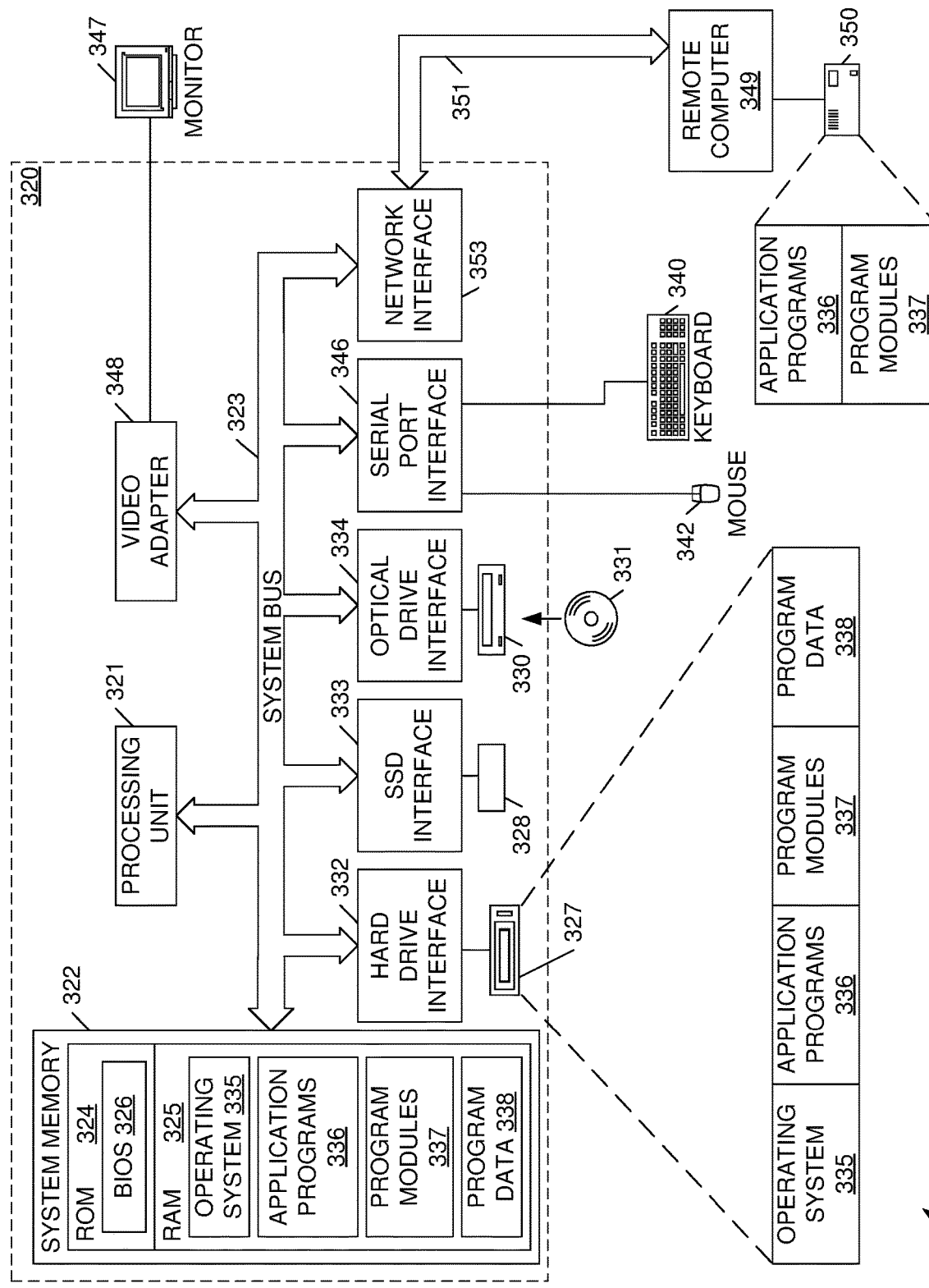
FIG. 3 depicts a general-purpose computing system 300 that can serve as a client or a server depending on the program modules and components included.

FIG. 3 and the following discussion are intended to provide a brief, general description of a suitable computing environment in which client and server software may be implemented. The foregoing examples are described in the general context of computer-executable instructions, such as program modules, executed on client and server computers linked through a communication network, including the Internet. Generally, program modules include routines, programs, objects, components, data structures, etc., that perform tasks or implement abstract data types. In a distributed computing environment, program modules may be in both local and remote memory storage devices, and may be executed by client and server computers.

FIG. 3 depicts a general-purpose computing system 300 that can serve as a client or a server depending on the program modules and components included. One or more computers of the type depicted in computing system 300 can be configured to perform operations described with respect to FIGS. 1 and 2. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 300 includes a conventional computer 320, including a processing unit 321, a system memory 322, and a system bus 323 that couples various system components including the system memory to the processing unit 321. The system bus 323 may be any of several types of bus structures, including a memory bus or memory controller, a peripheral bus, and a local bus using any of a variety of bus architectures. The system memory includes read only memory (ROM) 324 and random-access memory (RAM) 325. A basic input/output system 326 (BIOS), containing the basic routines that help to transfer information between elements within the computer 320, such as during start-up, is stored in ROM 324. The computer 320 further includes a hard disk drive 327 for reading from and writing to a hard disk, not shown, a solid-state drive 328 (e.g. NAND flash memory), and an optical disk drive 330 for reading from or writing to an optical disk 331 (e.g., a CD or DVD). The hard disk drive 327 and optical disk drive 330 are connected to the system bus 323 by a hard disk drive interface 332 and an optical drive interface 334, respectively. The drives and their associated computer-readable media provide nonvolatile storage of computer readable instructions, data structures, program modules and other data for computer 320. Other types of computer-readable media can be used.

Program modules may be stored on the hard disk, solid state disk 328, optical disk 331, ROM 324 or RAM 325, including an operating system 335, one or more application programs 336, other program modules 337, and program data 338. A user may enter commands and information into the computer 320 through input devices such as a keyboard 340 and pointing device 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB). A monitor 347 or other type of display device is also connected to the system bus 323 via an interface, such as a video adapter 348. In addition to the monitor, computers can include or be connected to other peripheral devices (not shown), such as speakers and printers.

The computer 320 may operate in a networked environment using logical connections to one or more remote computers, such as a remote computer 349. The remote computer 349 may be another computer, a server, a router, a network PC, a peer device or other common network node, and typically includes many or all of the elements described above relative to the computer 320, although only a memory storage device 350 has been illustrated in FIG. 3. The logical connections depicted in FIG. 3 include a network connection 351, which can support a local area network (LAN) and/or a wide area network (WAN). Such networking environments are commonplace in offices, enterprise-wide computer networks, intranets and the Internet.

Computer 320 includes a network interface 353 to communicate with remote computer 349 via network connection 351. In a networked environment, program modules depicted relative to the computer 320, or portions thereof, may be stored in the remote memory storage device. It will be appreciated that the network connections shown are exemplary and other means of establishing a communication link between the computers may be used.

Figure 4:
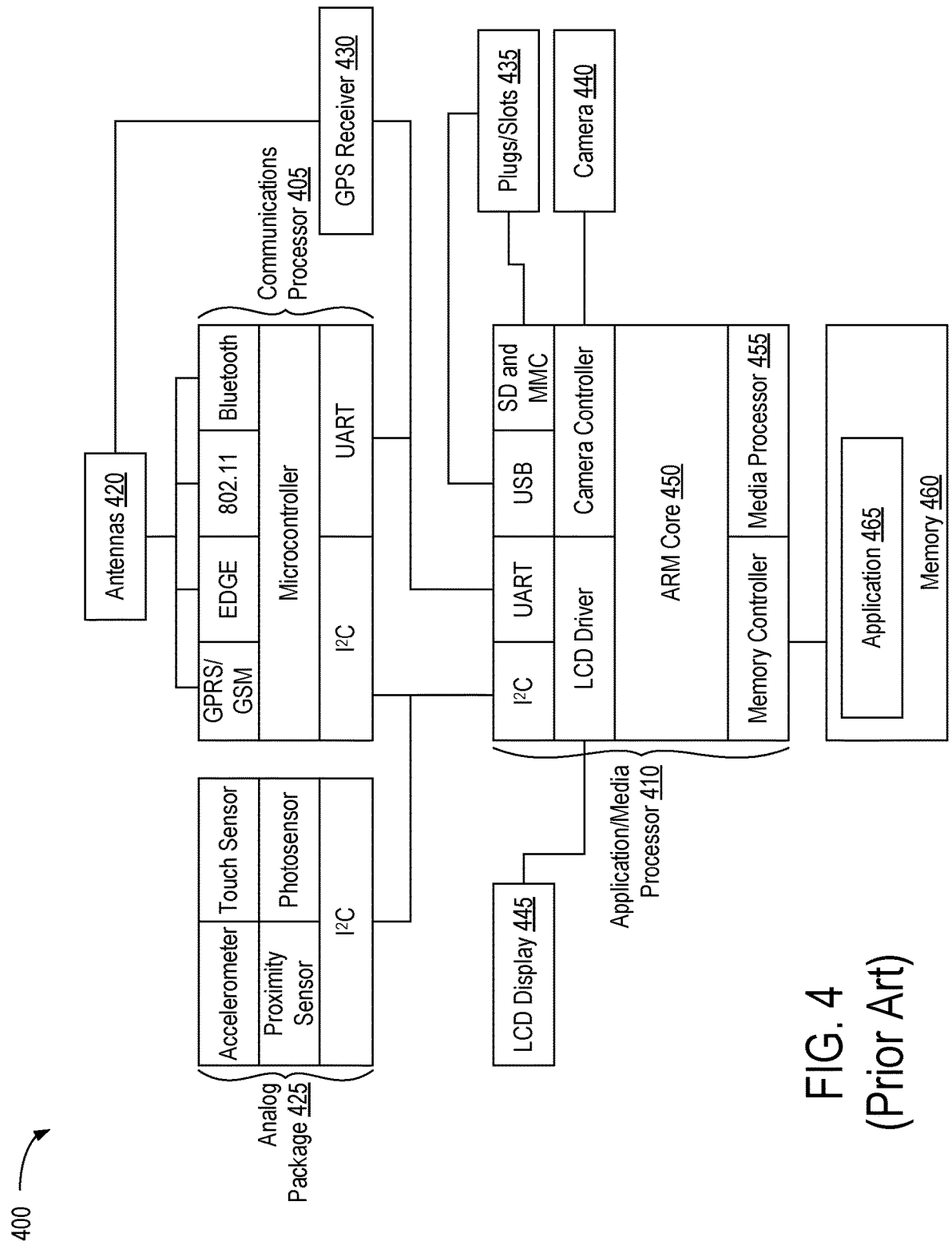
FIG. 4 is a block diagram of a conventional iPhone (phone 400), an Internet-connected multimedia smart phone available from Apple, Inc. of Cupertino, Calif.

FIG. 4 is a block diagram of a conventional iPhone (phone 400), an Internet-connected multimedia smart phone available from Apple, Inc. of Cupertino, Calif. Phone 400 may be programmed to perform the aforementioned functions of relay device 111R and target device 111T. Phone 400 and its constituent components are well understood by those of skill in the art. A brief description of the phone systems and subsystems is provided for context.

Phone 400 includes two processors, a communications processor 405 and an application/media processor 410 that are interconnected by a pair of serial interfaces I2C (for Inter-Integrated Circuit) and UART (for Universal Asynchronous Receiver/Transmitter). Communications processor 405, sometimes called a baseband processor, supports widely used wireless communication protocols, GPRS/GSM, EDGE, 802.11, and Bluetooth, and is coupled to a respective set of antennas 420 for this purpose. The GPRS/GSM block, part of the cellular front end, can be adapted to support different cellular communication standards in other embodiments. Phones in accordance with still other embodiments communicate via networks other than cellular networks, in which case the function of the cellular front end is provided by a different form of wireless network interface.

Processor 410 is at the heart of the phone, and includes support for a number of input/output devices in addition to what is provided by the communications processor. An analog package 425 includes orientation sensors, e.g., an accelerometer, a touch sensor, a proximity sensor, and a photo-sensor. The accelerometer allows the application processor to sense changes in phone orientation, the touch sensor supports the user interface, the proximity sensor senses, e.g., that the phone is near or far from the user's cheek or the difference between a cheek and a fingertip, and the photo-sensor provides a measure of ambient light for, e.g., adjusting display backlighting. Other useful input comes from a GPS receiver 430, plugs/slots 435 that support memory cards and a USB port, and a camera 440. Other sensors, such as a microphone, are not shown. User output is provided by an LCD display 245 and, though not shown, a speaker, headphone jack, and a motor supporting a vibrating alert.

Processor 410 includes two sub-processors, a general purpose ARM (Advanced RISC Machine) core 450 and a media processor 455 dedicated to the efficient processing of audio and video data. A memory device or module (multiple memory die) 460 stores instructions and data for processor 410. Memory 460 is implemented using, e.g., synchronous dynamic random access memory (SDRAM). Phone 400 is programmed, in accordance with one embodiment, to execute an application 465, similar to application 165 described above with respect to tablet 100.

One of ordinary skill in the art can appreciate that the invention can be implemented in connection with any electronic device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for remotely disabling a device in accordance with the present invention. The disclosed embodiments may apply to an environment with server computers and client computers deployed in a network environment or distributed computing environment, having remote or local storage. The disclosed embodiments may also be applied to standalone computing devices, having programming language functionality, interpretation and execution capabilities for generating, receiving and transmitting information regarding remote or local services. The lost-mode is particularly relevant to those computing devices that operate in a wireless network, although not limited thereto.

Although the invention has been described in connection with specific embodiments, variations of these embodiments will be obvious to those of ordinary skill in the art. Unless context dictates otherwise, the conjunction "or" is used herein in the logical sense to mean one, the other, or both. Modifications and variations likewise fall within the scope of the appended claims. Therefore, the spirit and scope of the claims should not be limited to the foregoing description. Only those claims specifically reciting "means for" or "step for" should be construed in the manner required under the sixth paragraph of 35 U.S.C. § 112.

What is claimed is:

1. A method of controlling a target wireless device designated by a target-wireless-device phone number using an administrative wireless device designated by an administrative-wireless-device phone number, the method comprising:
   encrypting a payload that includes the administrative-wireless-device phone number, thereby creating an encrypted payload; and
   directing a lost-mode message to the target-wireless-device phone number, the lost-mode message including the encrypted payload.

2. The method of claim 1, further comprising receiving the encrypted payload at the administrative wireless device.

3. The method of claim 2, further comprising requesting the encrypted payload responsive to a report identifying the target wireless device.

4. The method of claim 1, wherein the encrypted payload comprises a lost-mode command.

5. The method of claim 1, wherein the encrypted payload includes the target-wireless-device phone number.

6. The method of claim 1, wherein the encrypted payload includes an identifier unique to the target wireless device.

7. The method of claim 1, wherein the lost-mode message includes a time stamp indicative of a time the lost-mode message was created.

8. The method of claim 7, further comprising, at the target wireless device:
   comparing the time stamp with an earlier-received time stamp associated with another command.

9. The method of claim 1, further comprising, at the target wireless device:
   receiving the lost-mode message accompanied by a sender phone number;
   comparing the sender phone number to the administrative-wireless-device phone number; and
   executing a lost-mode command responsive to the comparing.

10. A system for controlling a target wireless device designated by a target-wireless-device phone number, the system comprising:
    an administrative device designated by an administrative-wireless-device phone number, the administrative device adapted to convey a lost-mode message to the target-wireless-device phone number, the lost-mode message including a payload with a lost-mode command and the administrative-wireless-device phone number, wherein the payload includes the administrative-wireless-device phone number as an encrypted number.

11. The system of claim 10, wherein the administrative device encrypts the administrative-wireless-device phone number to produce the encrypted number.

12. The system of claim 10, wherein the lost-mode message specifies the target-wireless-device phone number and a device identifier of the target wireless device.

13. The system of claim 10, further comprising a server remote from the administrative device, the server to encrypt at least a portion of the payload.

14. The system of claim 10, further comprising a server to prepare the lost-mode message and convey the lost-mode message to the administrative device.

* * * * *